United States Patent Office 3,126,749
Patented Mar. 31, 1964

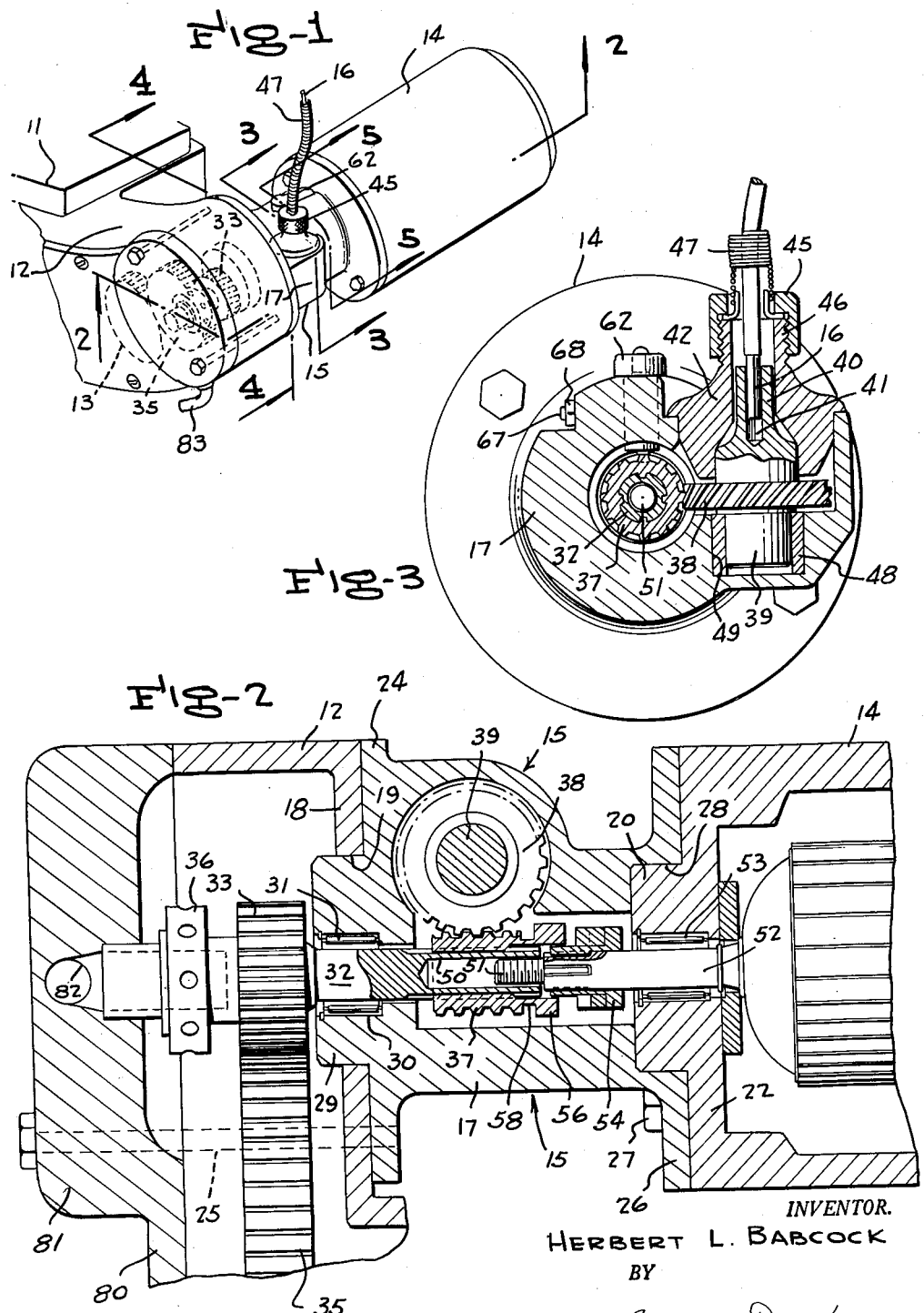

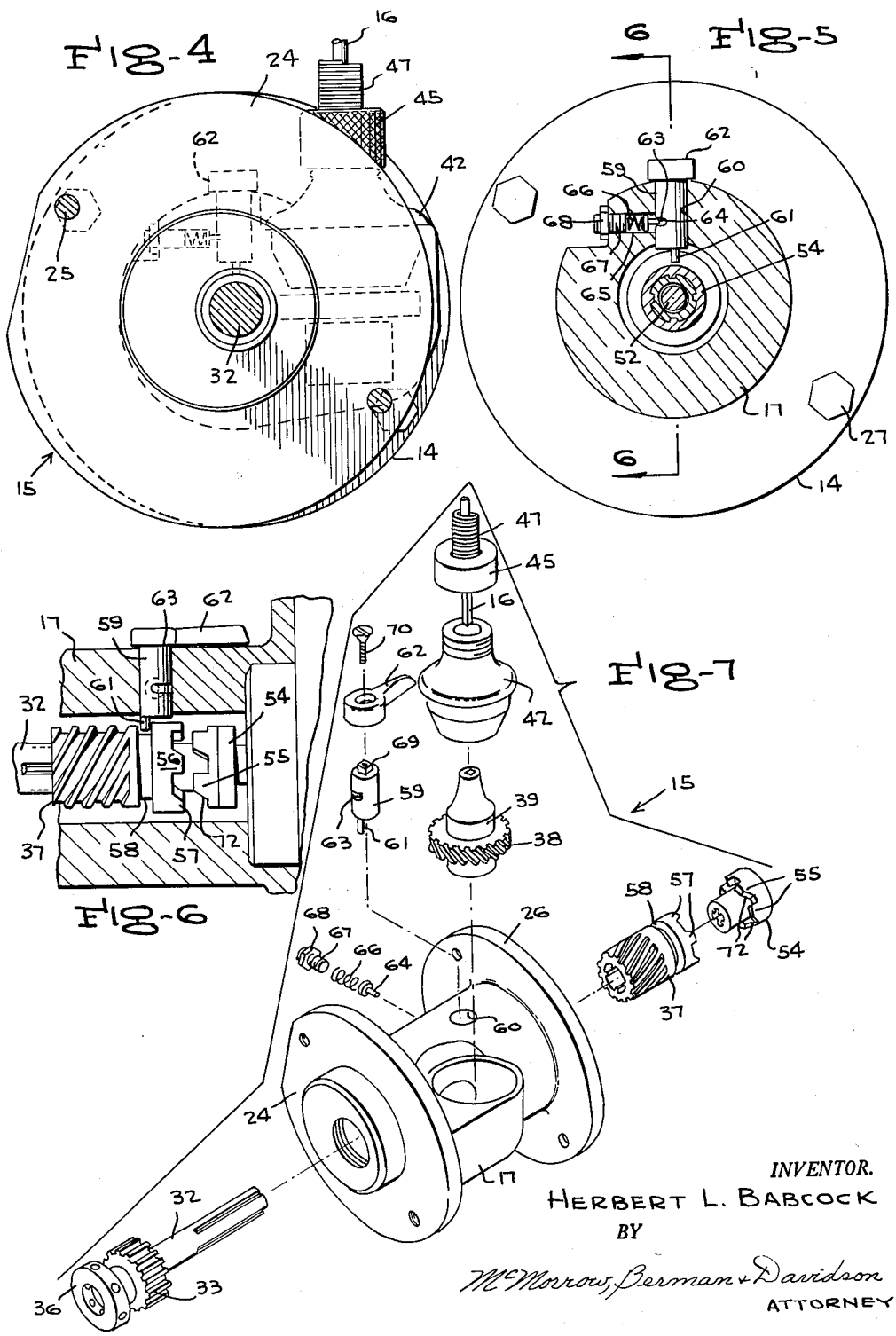

3,126,749
MOTORCYCLE TACHOMETER DRIVE UNIT
Herbert L. Babcock, Canton, Ill.
(1318 Main, Davenport, Iowa)
Filed Jan. 19, 1962, Ser. No. 167,338
6 Claims. (Cl. 74—15.2)

This invention relates to power transmission mechanisms, and more particularly to a drive transmission for the tachometer of a motorcycle.

A main object of the invention is to provide a novel and improved tachometer drive mechanism for a motorcycle which is also adapted to drive the generator of the motorcycle, the mechanism being relatively simple in construction, being compact in size, and being provided with easily accessible and operable means for selectively coupling and uncoupling the motorcycle generator to the drive mechanism.

A further object of the invention is to provide an improved transmission mechanism for driving the tachometer of a motorcycle, the mechanism being adapted to fit into the space ordinarily provided for the generator of the motorcycle, and the mechanism being provided with means for mounting the motorcycle generator thereon and with means for selectively coupling or uncoupling the generator thereto, whereby the generator may be driven from the tachometer drive mechanism as desired.

A still further object of the invention is to provide an improved tachometer drive mechanism which may be installed on a motorcycle in association with the motorcycle generator and which may be employed as a combination transmission means for operating the motorcycle tachometer and the generator, the mechanism being relatively inexpensive to manufacture, being durable in construction, and being easy to install.

A still further object of the invention is to provide an improved tachometer drive mechanism for use with a motorcycle, the mechanism being adapted to be mounted on the motorcycle engine crankcase in the position normally occupied by the motorcycle generator and being provided with means for mounting the motorcycle generator thereon, the mechanism being further provided with manually controlled selecting means for coupling or uncoupling the generator to the drive mechanism, whereby the generator need not be driven when it is unnecessary to operate same, thus saving horsepower and minimizing wear on the generator and associated electrical system.

Further objects and advantages of the invention will become apparent from the following description and claims, and from the accompanying drawings, wherein:

FIGURE 1 is a perspective view of an installation including an improved tachometer drive mechanism constructed in accordance with the present invention and illustrating the manner in which the mechanism is installed between a portion of the crankcase of a motorcycle and the motorcycle generator.

FIGURE 2 is an enlarged horizontal cross sectional view taken substantially on the line 2—2 of FIGURE 1.

FIGURE 3 is an enlarged transverse vertical cross sectional view taken substantially on the line 3—3 of FIGURE 1.

FIGURE 4 is an enlarged transverse vertical cross sectional view taken substantially on the line 4—4 of FIGURE 1.

FIGURE 5 is an enlarged transverse vertical cross sectional view taken substantially on the line 5—5 of FIGURE 1.

FIGURE 6 is a vertical cross sectional view taken on the line 6—6 of FIGURE 5.

FIGURE 7 is a perspective view of the tachometer transmission mechanism employed in FIGURES 1 to 6 with the elements thereof shown in separated positions.

Referring to the drawings, 11 designates a conventional motorcycle engine crankcase which is formed with an outwardly projecting housing segment 12 which normally contains a suitable gear train coupling the cam gear 13 of the motorcycle engine to the generator 14 associated with the engine. In accordance with the present invention, a tachometer drive unit, designated generally 15, is inserted between the crankcase extension 12 and the generator 14, the transmission unit 15 being arranged to transmit driving torque to a tachometer cable 16, as well as to drive the generator 14.

As shown in FIGURE 2, the tachometer transmission mechanism 15 comprises a main housing portion 17 formed at one end to interfit with the end wall 18 of the crankcase extension housing 12. Thus, as shown in FIGURE 2, the end wall 18 is formed with an aperture 19 which normally receives the end boss 20 of the generator 14, allowing the end wall 22 of the generator to be bolted to the wall 18. The transmission housing 17 is provided with an end wall 24 which is formed to replace the end wall 22 of the generator and to be secured to the housing extension 12, for example, by means of fastening bolts 25 threadedly engaging wall 24, as shown in FIGURE 2. Similarly, the opposite end of the housing 17 of the tachometer transmission unit comprises an end flange 26 shaped to interfit with the end of the generator 14 and adapted to be bolted thereto by means of suitable fastening bolts 27. Thus, the outer end of the housing 17 is formed with a recess 28 adapted to snugly receive the end boss 20 of generator 14.

Opposite the recess 28, the transmission housing 17 is formed with the boss 29 which is snugly receivable in the aperture 19 in place of the generator end boss 20.

The transmission housing 17 is formed in the boss 29 with an annular recess 30 containing a longitudinally extending needle-bearing assembly 31 which rotatably supports the longitudinally extending main shaft 32 of the transmission unit. Secured on the main shaft 32 and projecting into the housing extension 12 is a gear 33 which is coupled to the cam gear 13 of the motorcycle engine by an idler gear 35. The tachometer gear 33 is selected so that the number of teeth on the cam gear 13 is an integral multiple of the number of teeth on the transmission gear 33, for example, being in a two-to-one ratio therewith. Thus, in a typical embodiment of the invention, the cam gear 13 had 36 teeth and the driven gear 33 had 18 teeth, whereas the idler gear 35 had 46 teeth. The idler gear 35 is journaled in any suitable manner in the housing extension 12.

The end of the shaft 32 carries a conventional oil slinger disc 36 adapted to distribute lubricating oil in the crankcase extension 12.

The crankcase extension 12 is provided with the cover plate 80 having a circular portion 81 located adjacent the slinger disc 36. A breather opening 82 is provided in the peripheral wall of portion 81, and a breather pipe 83 is connected to said wall in communication with said breather opening to allow free escape of vapor under pressure from the crankcase.

Designated at 37 is a worm which is slidably and nonrotatably mounted on the shaft 32, for example, being splined thereon, and meshing with a helical gear 38 carried on a vertical shaft element 39 journaled in the transmission housing 17 and being formed with a reduced top portion 40 having a squared axial bore 41 adapted to receive the squared end of the tachometer cable 16. An annular bushing 42 is rigidly secured in the portion of the transmission housing 17 above the gear 38, the bushing surrounding the top portion of the shaft 39 and the reduced top end 40 thereof, as shown in FIGURE 3. A retaining nut 45 is threadedly engaged on the reduced top end 46 of bushing 42 and clamps the end of the flexible tachometer cable sleeve 47 to the end of top portion 46 of bushing 42, as illustrated in FIGURE 3.

The lower end of the shaft 39 is rotatably received in a sleeve bearing 48 provided in the lower end of the vertical bore 49 provided in housing 17 for the shaft 39.

It will be seen that the mechanism thus far described provides direct transmission of torque from the cam gear 13 to the tachometer driving shaft 39, whereby the tachometer cable 16 is driven directly from said cam gear 13.

The end portion of shaft 32 opposite the oil slinger disc 36 is formed with an axial bore 50 in which is received the reduced end 51 of the generator armature shaft 52. As shown in FIGURE 2, the armature shaft 52 is journaled in the boss 20 by means of a suitable bearing unit 53. Rigidly secured on the shaft 52, for example, by being rigidly keyed thereto, is a toothed clutch collar 54 having the longitudinally extending clutch teeth 55 directed toward the worm 37. Integrally formed on the end portion of the worm 37 in opposing relationship to the collar 54 is a mating toothed clutch element 56 provided with the clutch teeth 57 directed toward the opposing clutch collar 54. The teeth 57 are shaped to lockingly interengage between the teeth 55 when the worm 37 is shifted to the right from the position thereof illustrated in FIGURE 2. This drivingly couples the generator armature shaft 52 to the transmission shaft 32, driving the generator.

The worm 37 is formed adjacent the clutch element 56 with an annular groove 58. Rotatably mounted in the top wall portion of the transmission housing 17 immediately above the annularly grooved end portion of the worm 37 is a cylindrical vertical shaft 59, said shaft being rotatable in a cylindrical bore 60 formed in the top wall portion of housing 17, as shown in FIGURE 5. The bottom end of the shaft 59 is provided with a depending axially extending lug 61 which is offset a substantial distance from the axis of the shaft 59 and which slidably engages in the annular groove 58 of worm 37. The shaft 59 is provided on its top end with the laterally extending operating handle 62 which is exposed on the top wall portion of the transmission housing 17, and which is readily accessible to the operator of the motorcycle.

The vertical clutch operating shaft 59 is formed at its intermediate portion with a horizontally extending peripheral groove 63 in which is engaged a spring-biased stop pin 64 slidably mounted in a bore 65 formed in the top wall portion of the housing 17, the pin 64 being engaged by a coiled spring 66 which bears against a stud 67 threadedly secured in the end of the bore 65 and locked thereto by a lock nut 68, as shown in FIGURE 5. The spring 66 thus constantly urges the pin 64 inwardly and maintains said pin in the peripheral groove 63 of shaft 59. This limits the rotation of the shaft 59 to an angle sufficient to engage and disengage the toothed clutch element 56 of worm 37 and the clutch collar 54.

As shown in FIGURE 7, the vertical shaft 59 is formed at its top end with a squared lug 69 engageable in a squared bore (not shown) in the end of the handle 62. A fastening screw 70 is employed to secure the handle 62 on the top end of the shaft 59, the screw 70 being threadedly engaged in the top portion of shaft 59 and holding the handle 62 on said top end and interlocked with the squared lug 69. In operation, the tachometer cable 16 is constantly driven by the cam gear 13 through the idler 35, the gear 33, the shaft 32, the worm 37, the worm gear 38 and the vertical worm gear shaft 39. When it is desired to drive the generator, the handle 62 is manually rotated, causing the lug 61 to shift the worm 37 to the right, as viewed in FIGURE 2, so that the clutch element 56 interenges with the clutch sleeve 54. The spring 66 exerts a substantial inward force on the pin 64 so that the pin frictionally engages the bottom of the peripheral groove 63 and thus frictionally holds the shaft 59 against rotation unless the handle 62 is manually rotated. Thus, the clutch element 56 will remain in coupling engagement with the clutch collar 54 until the worm 37 is retracted by reverse operation of the clutch operating handle 62.

As shown in FIGURE 7, the interengaging clutch teeth 55 and 57 are formed with sloping edges 72 to facilitate smooth interengagement of the clutch teeth when the worm 37 is shifted toward coupling position, and also to provide smooth disengagement of the clutch element 56 from the clutch collar 54 when the worm 37 is shifted in a direction to uncouple element 56 from collar 54.

While a specific embodiment of an improved tachometer drive mechanism for use in a motorcycle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, an engine crankcase, an outwardly projecting housing segment on said crankcase, an engine-driven rotating element in said crankcase, a shaft journaled in said housing segment, means gearingly coupling said shaft to said rotating element, a worm slidably and non-rotatably mounted on said shaft, a worm gear journaled in said housing segment and meshing with said worm, means for drivingly connecting said worm gear continuously to a tachometer, a generator connected to said housing segment, said generator having a driving shaft aligned with said first-named shaft, a toothed clutch collar secured on said driving shaft and facing said worm, a toothed clutch element on the end of said worm adjacent said clutch collar and being meshingly engageable therewith, and means to slide the worm toward and away from said clutch collar to selectively couple and uncouple the worm to and from said toothed clutch collar, whereby to selectively connect and disconnect said generator to and from said first-named shaft without disturbing the connection of the worm gear to the tachometer.

2. In combination, an engine crankcase, an outwardly projecting housing segment on said crankcase, an engine-driven cam gear in said crankcase, a shaft journaled in said housing segment, a transmission gear mounted on said shaft, the number of teeth on the cam gear being an integral multiple of the number of teeth on the transmission gear, idler gear means coupling the cam gear to the transmission gear, a worm slidably and non-rotatably mounted on said shaft, a worm gear journaled in said housing segment and meshing with said worm, means for drivingly connecting said worm gear continuously to a tachometer, a generator connected to said housing segment, said generator having a driving shaft aligned with said first-named shaft, a toothed clutch collar secured on the driving shaft and facing said worm, a toothed clutch element on the end of said worm adjacent said clutch collar and being meshingly engageable therewith, and means to slide the worm toward and away from said clutch collar to selectively couple and uncouple the worm to and from said toothed clutch collar, whereby to selectively connect and disconnect said generator to and from said first-named shaft without disturbing the connection of the worm gear to the tachometer.

3. In combination, an engine crankcase, an outwardly projecting housing segment on said crankcase, an engine-driven cam gear in said crankcase, a shaft journaled in said housing segment, a transmission gear mounted on said shaft, the number of teeth on the cam gear being an integral multiple of the number of teeth on the transmission gear, idler gear means coupling the cam gear to the transmission gear, a worm slidably and non-rotatably mounted on said shaft, a worm gear journaled in said housing segment and meshing with said worm, means for drivingly connecting said worm gear continuously to a tachometer, a generator connected to said housing segment, said generator having a driving shaft aligned with said first-named shaft, a toothed clutch collar secured on said driving shaft and facing said worm, a toothed clutch element on the end of said worm adjacent said clutch collar and being meshingly engageable therewith, said worm being formed with an annular groove, a clutch-operating shaft journaled in said housing segment and having an axially extending lug offset from its axis and engaging in said groove, and an operating arm on said clutch-operating shaft for manually rotating same whereby to slide the worm toward and away from said clutch collar to selectively couple and uncouple the worm to and from said toothed clutch collar, and whereby to selectively connect and disconnect said generator to and from said first-named shaft without disturbing the connection of the worm gear to the tachometer.

4. In combination, an engine crankcase, an outwardly projecting housing segment on said crankcase, an engine-driven rotating element in said crankcase, a shaft journaled in said housing segment, means gearingly coupling said shaft to said rotating element, a worm slidably and non-rotatably mounted on said shaft, a worm gear journaled in said housing segment and meshing with said worm, means for drivingly connecting said worm gear continuously to a tachometer, a generator connected to said housing segment, said generator having a driving shaft aligned with said first-named shaft, a toothed clutch collar secured on said driving shaft and facing said worm, a toothed clutch element on the end of said worm adjacent said clutch collar and being meshingly engageable therewith, said worm being formed with an annular groove, a clutch-operating shaft journaled in said housing segment and having an axially extending lug offset from its axis and engaging in said groove, and an operating arm on said clutch-operating shaft for manually rotating same, whereby to slide the worm toward and away from said clutch collar to selectively couple and uncouple the worm to and from said toothed clutch collar, and whereby to selectively connect and disconnect said generator to and from said first-named shaft without disturbing the connection of the worm gear to the tachometer.

5. In combination, an engine crankcase, an outwardly projecting housing segment on said crankcase, an engine-driven cam gear in said crankcase, a shaft journaled in said housing segment, a transmission gear mounted on said shaft, the number of teeth on the cam gear being an integral multiple of the number of teeth on the transmission gear, idler gear means coupling the cam gear to the transmission gear, a worm slidably and non-rotatably mounted on said shaft, a worm gear journaled in said housing segment and meshing with said worm, means for drivingly connecting said worm gear continuously to a tachometer, a generator connected to said housing segment, said generator having a driving shaft aligned with said first-named shaft, a toothed clutch collar secured on said driving shaft and facing said worm, a toothed clutch element on the end of said worm adjacent said clutch collar and being meshingly engageable therewith, said worm being formed with an annular groove, a clutch-operating shaft journaled in said housing segment and having an axially extending lug offset from its axis and engaging in said groove, an operating arm on said clutch-operating shaft for manually rotating same, whereby to slide the worm toward and away from said clutch collar, to selectively couple and uncouple the worm to and from said toothed clutch collar, and whereby to selectively connect and disconnect said generator to and from said first-named shaft without disturbing the connection of the worm gear to the tachometer, and means limiting rotation of said clutch-operating shaft to an angle sufficient to engage and disengage said toothed clutch element and said clutch collar.

6. In combination, an engine crankcase, an outwardly projecting housing segment on said crankcase, an engine-driven cam gear in said crankcase, a shaft journaled in said housing segment, a transmission gear mounted on said shaft, the number of teeth on the cam gear being an integral multiple of the number of teeth on the transmission gear, idler gear means coupling the cam gear to the transmission gear, a worm slidably and non-rotatably mounted on said shaft, a worm gear journaled in said housing segment and meshing with said worm, means for drivingly connecting said worm gear continuously to a tachometer, a generator connected to said housing segment, said generator having a driving shaft aligned with said first-named shaft, a toothed clutch collar secured on said driving shaft and facing said worm, a toothed clutch element on the end of said worm adjacent said clutch collar and being meshingly engageable therewith, said worm being formed with an annular groove, the clutch-operating shaft being journaled in said housing segment and having an axially extending lug offset from its axis and engaging said groove, an operating arm on said clutch-operating shaft for manually rotating same, whereby to slide the worm toward and away from said clutch collar to selectively couple and uncouple the worm to and from said toothed clutch collar, whereby to selectively connect and disconnect said generator to and from said first-named shaft without disturbing the connection of the worm gear to the tachometer, said clutch-operating shaft being formed with a peripheral groove, and stop lug means on the housing segment resiliently engaging in said last-named groove, said last-named groove being of a peripheral length to limit rotation of said clutch-operating shaft to an angle sufficient to engage and disengage said toothed clutch element and said clutch collar.

References Cited in the file of this patent

UNITED STATES PATENTS

| | | |
|---|---|---|
| 1,573,359 | Ruckstell | Feb. 16, 1926 |
| 2,163,035 | Grupe | May 6, 1939 |
| 2,241,495 | Wagner | May 13, 1941 |

FOREIGN PATENTS

| | | |
|---|---|---|
| 317,236 | Italy | Apr. 30, 1934 |